United States Patent Office 2,825,048
Patented Feb. 25, 1958

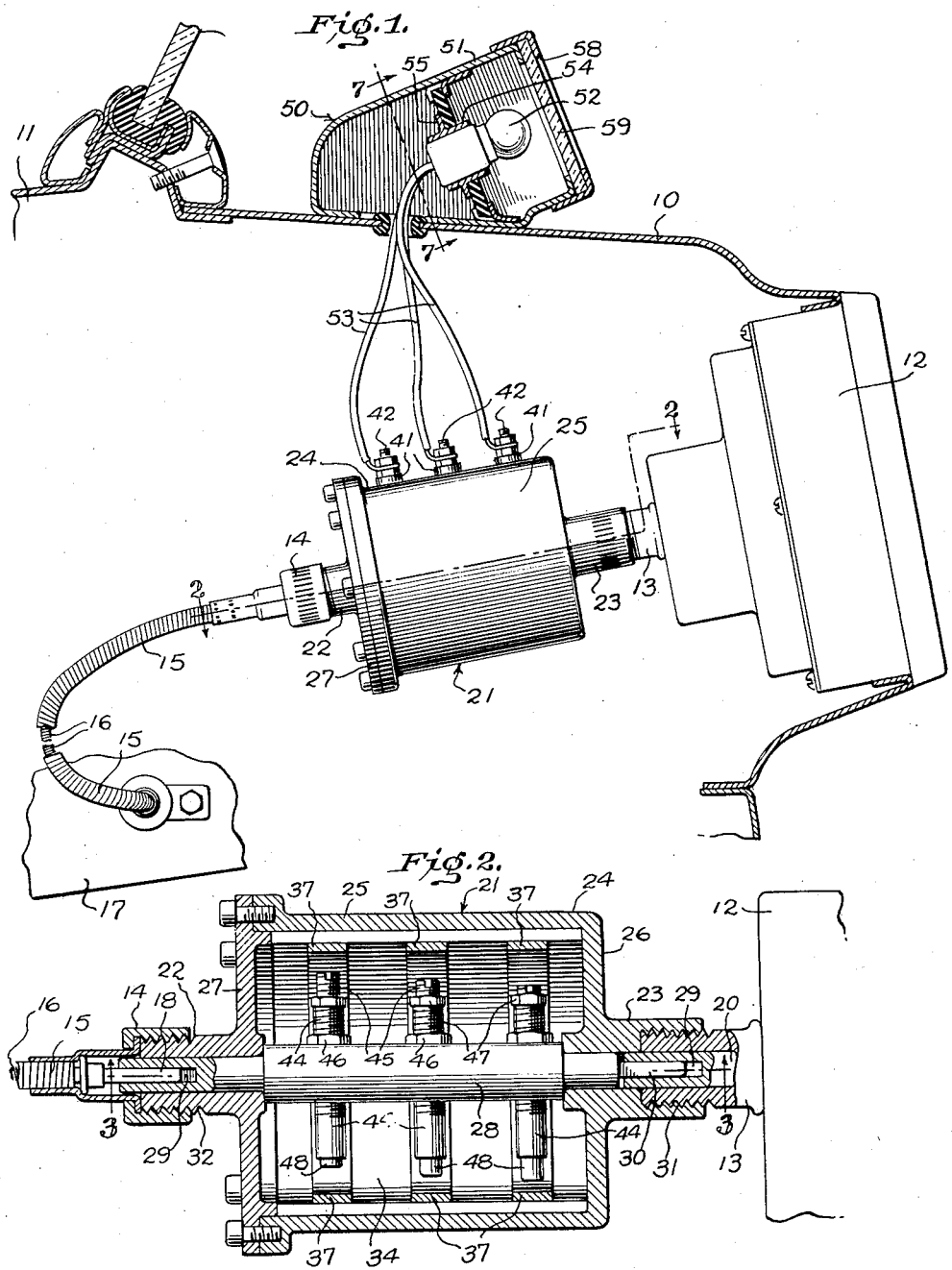
Feb. 25, 1958          F. R. JAYNES          2,825,048
SAFETY SPEED-INDICATING DEVICE FOR MOTOR VEHICLES
Filed Feb. 10, 1956          2 Sheets-Sheet 1
INVENTOR.
Floyd R. Jaynes
BY Reginald W. Hoagland
ATTORNEY

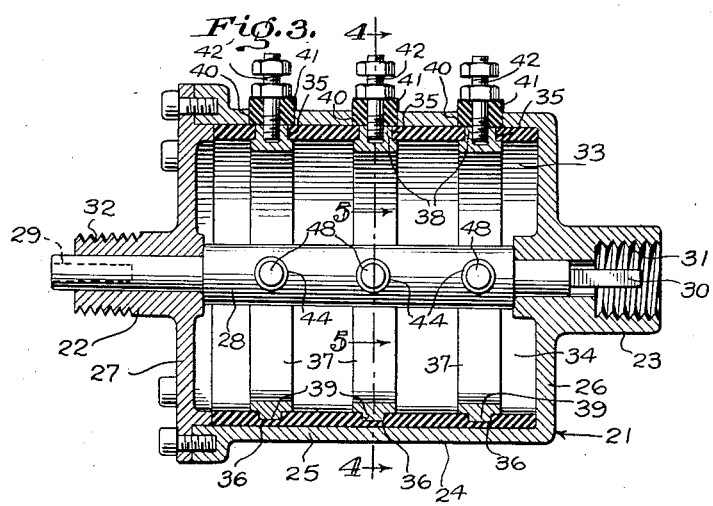

2,825,048

SAFETY SPEED-INDICATING DEVICE FOR MOTOR VEHICLES

Floyd R. Jaynes, Fairgrove, Mich.

Application February 10, 1956, Serial No. 564,761

6 Claims. (Cl. 340—264)

The present invention relates to speed-indicating devices for use in addition to the usual speedometers on motor vehicles, and for giving either visible or audible signals when the vehicle exceeds predetermined safety driving speeds, and aims to provide a novel and improved device of this character which is simple and substantial in construction, economical to manufacture, and thoroughly efficient and practical in use.

Another object of the invention is to provide a mechanically operated electric circuit-making and -breaking unit of a device of the above-indicated character that can be quickly and conveniently installed on a motor vehicle by merely disconnecting the flexible drive cable from the speedometer or transmission of said vehicle and threadably connecting said speedometer or transmission and said flexible drive cable to opposite ends of the unit.

A further object of the invention is to provide, in a device as previously set forth, a plurality of circuit-making and -breaking elements that are operated by centrifugal force and each adjustable for closing an electric circuit at a different speed of rotation of a common shaft interposed between the speedometer and the flexible drive cable of a conventional motor vehicle.

It is also an object of the invention to provide, in a device as outlined above, a plurality of indicating elements arranged in a single group or separately, each indicating element being electrically connected to a different circuit-making and -breaking element, and comprising, for example, a different colored light to designate a different speed the vehicle is traveling.

These, together with various auxiliary features and objects of the invention which will later become apparent as the following description proceeds, are attained by the present invention, a preferred embodiment of which has been illustrated by way of example only in the accompanying drawings, wherein:

Figure 1 is a vertical sectional view through the lower portion of the windshield and the instrument panel of an automobile at the location where the speedometer is mounted, and showing the improved speed-indicating device attached;

Figure 2 is a horizontal section taken on line 2—2 of Figure 1;

Figure 3 is a vertical section taken on line 3—3 of Figure 2 with the speedometer drive cable and speedometer detached;

Figure 4 is a transverse section taken on line 4—4 of Figure 3;

Figure 5 is a fragmentary enlarged transverse section taken on line 5—5 of Figure 3;

Figure 6 is a face view of a group of indicating elements shown in section in Figure 1; and Figure 7 is a longitudinal section through the casing of the group of indicating elements and taken on line 7—7 of Figure 1.

Referring now more specifically to the accompanying drawings wherein like numerals designate similar parts throughout the various views, attention is directed first to Figure 1 wherein it will be seen that there is indicated by the numeral 10 an automobile instrument panel which is attached to a cowl and dash assembly 11, and which has a speedometer 12 mounted thereon. On the forward side of the casing of the speedometer that is obscured from the view of passengers in the vehicle, there is provided a threaded nipple which normally has ataached thereto a coupling nut 14 on the upper end of a flexible casing arranged about a drive cable 16. In most instances, the opposite or lower ends of the cable 16 and its flexible casing 15 are connected to a gear-driven shaft and fitting, respectively (not shown), on the transmission 17 of the automobile. As shown in Figure 2, a key 18, usually square in cross section, is formed on the end of the drive cable 16 within the coupling nut 14 and was intended to be received in a like shaped keyway 19 in the end of a rotatable part 20 of the speedometer and within the threaded nipple 13 upon threading said nut upon said nipple.

The improved indicator forming the subject matter of the present invention has an electric contact-making and -breaking unit thereon, generally indicated by the numeral 21, interposed between the speedometer 12 and flexible drive therefor by disconnecting the normally connected coupling nut 14 from the nipple 13 and threadably connecting said nut and nipple to oppositely directed bosses 22 and 23, respectively, on opposite ends of a drum-shaped housing 24 of the unit 21. The housing has a cylindrical wall 25, an end wall 26 integral with said cylindrical wall, and another and opposite end wall 27 detachable from said cylindrical wall. The bosses 22 and 23, which are centrally located on the end walls 27 and 26, respectively, have bearings therein that rotatably support the opposite reduced ends of a shaft 28 within the housing.

The reduced end of the shaft 28 in the bearing provided in the end wall 27 and boss 22 has a longitudinally extending recessed keyway 29 therein of a size and shape similar to the keyway 19 for receiving the squared key 18 of the drive cable 16, while on the opposite reduced end of said shaft which is in the bearing provided in the end wall 26 and boss 23, there is provided a squared key extension 30 similar in size and shape to the key 18 for engaging into the keyway 19 in the rotatable part 20 of the speedometer. In the boss 23, there is an internally threaded opening 31 into which the nipple 13 is threadably connected for retaining the key 30 in the keyway 19 and for bodily supporting the unit 21 on the speedometer 12, while the boss 22 is externally threaded, as at 32, for attachment of the coupling nut 14 thereto and thereby maintain the key 18 in the keyway 29.

Closely fitted to the inner cylindrical surface of the wall 25 and between the inner side of the end walls 26 and 27, there is a cylindrical sleeve of insulating material which is constructed in halves for assembly purpose and thereby providing a pair of abutting semicircular sections 33 and 34. Through the section 33 substantially midway between the abutting edges thereof with the other section, there are spaced holes 35, while in the other section 34 and directly opposite the holes 35, there are similarly spaced recesses 36 extending only partially through said section. A plurality of spaced electrical contact rings 37 are positioned within said insulation sleeve composed of the sections 33 and 34 and have outwardly directed lugs 38 and 39 thereon projecting through and engaging into the holes 35 and recesses 36, respectively. Aligned with the holes 35 and extending through the cylindrical wall 25 of the housing, there are larger holes 40 into which are arranged collars 41 of insulating material. Projecting through the collars 41 and threaded into openings in the lugs 38 are terminal bolts 42 for providing electrical connections to the rings 37 that are insulated from the housing. While there are illustrated three rings and separate electrical connections thereto, it is to be understood that a single ring or any number of rings insulated from one another and the housing may be employed.

Extending transversely through the shaft 28, there is a plurality of spaced threaded openings 43 corresponding in number to the amount of contact rings employed, and each at a location along said shaft within the outer confines of a different ring. Threaded in each opening 43 and having its end portions protruding to opposite sides of the shaft is a tubular member 44 which is also threaded interiorly at one of its end portions for receiving an adjusting screw 45. There are lock nuts 46 and 47 on the tubular member 44 and the adjustment screw 45, respectively, for maintaining the same in adjusted positions. Slidable in the opposite end portion of each tubular member 44 is a movable plungerlike contact 48 that is adapted to be moved outwardly toward its corresponding contacting ring 27 by centrifugal force produced by rotation of the shaft 28. A spiral contractile spring 49 within each of said tubular members and having one of its ends connected to an adjustment screw 45 and its other end to a movable contact member 48 exerts tension which must be overcome for said movable contact to move outwardly.

The purpose of having a plurality of contact rings 27 and a movable contact 48 for each ring is to close electric circuits to different indicating elements when the vehicle is exceeding different speeds. For example, the spring tension against which one movable contact 48 must move may be adjusted by the screw 45 to engage the contact with the contact ring at five miles per hour, another to effect engagement at twenty-five miles per hour, and the other at fifty-five miles per hour. The object for indicating five miles per hour is to indicate that the device is in proper operating condition, while the speeds of twenty-five and fifty-five miles per hour are for indicating when the vehicle is exceeding the speed in city traffic and the speed on open highways, respectively.

Mounted anywhere on the vehicle, but preferably directly in front of the driver, either above and forwardly of the instrument panel 10, or on the hood, is a plurality of visible or audible indicating elements designated generally by the numeral 50. These elements are arranged separately, or are in a group contained in a single casing 51, as shown in Figures 1, 6, and 7 of the drawings. For the purpose of illustration, there are shown different light bulbs 52, each with a different wire 53 leading therefrom and to a different terminal 42 on the unit 21. The light bulbs are supported in sockets 54 fixed to a back plate 55 which is insulated from the casing 51 and connected by a wire 56 to a battery 57 which in turn is grounded, as shown in Figure 7. The forward portion of the casing 51 is divided into separate compartments for each light bulb 52 and has a window 58 in each compartment that is closed by a different colored transparent lens 59. Thus, upon engagement of the different movable contacts with the contact rings, different colored lights will appear, and as each color is representative of a predetermined speed to which the device is adjusted, the speed limit the vehicle is exceeding may be easily observed. A solenoid-actuated switch or other mechanism (not shown) may be employed in each circuit and energized by current passing through another circuit for opening a previously closed circuit when a circuit indicating a higher rate of speed is closed.

By having a detachable end wall 27 on the housing 24, it can be seen that should the speeds of rotation of the shaft at the time of engagement of the movable contacts 48 with the contact rings 37 not be in accordance with the speed laws of a selected town, city, or state, it is an easy matter to remove the rotor consisting of the shaft 28 and movable contacts 48 from the housing to adjust the screws 45 and change contact engagement at different speeds. It should be observed that further adjustment can be had by adjusting the tubular members 44 transversely of the shaft 28. While the end wall 27 is still removed from the housing, the contact rings 37 and insulation sleeve may also be removed for cleaning or replacing parts by merely unthreading the terminal bolts 42 and sliding the ring and sleeve assembly outwardly through the open end of the housing.

While there is herein shown and described a metallic housing and a sleeve of insulating material for supporting and electrically insulating a plurality of contact rings from one another and from said housing, it is to be understood that the sleeve may be dispensed with and that the housing may be of insulating material molded or otherwise secured to the contact rings.

To install the unit 21 comprising the electric contact-making and -breaking mechanisms to the usual motor vehicle requires merely the disconnecting of the coupling nut 14 on the flexible drive cable 16 from the nipple 13 on the speedometer 12, the threading of the boss 23 of the housing 24 onto the nipple 13, and threading of the coupling nut 14 onto the other boss 22 on the opposite side of the housing. This novel construction and association with the existing elements now on motor vehicles provides a simple and convenient way of obtaining a source of power of variable speeds in accordance with different speeds of travel of the vehicle for operation of the improved indicator, and in no way does it affect the normal operation of the speedometer.

Although I have herein shown and described the electric contact-making and -breaking unit 21 as being located at the connection of the flexible drive cable 16 to the speedometer 12 and as being bodily supported by the speedometer, it is to be understood that said unit 21 can be located at the connection of said drive cable 16 to the transmission 17 and be bodily supported by said transmission. Also, it is to be understood that if desired, the unit 21 may be supported at any other location on the vehicle and a pair of drive cables with proper connections thereon may be employed for connecting the opposite ends of said unit to the speedometer 12 and to the transmission 17.

In view of the above description, taken in conjunction with the accompanying drawings, it is believed that a clear understanding of the construction, operation, and advantages of the improved invention will be quite apparent to those skilled in this art. A more detailed description is accordingly deemed unnecessary.

It is to be understood, however, that even though there is herein shown and described a preferred embodiment of the invention, various changes may be made without departing from the spirit or full intendment of the invention.

What is claimed is:

1. A safety speed indicator for motor vehicles having a speedometer and a flexible drive cable detachably connected to a rotary part of said speedometer, said speed indicator comprising a housing having a cylindrical wall, a shaft mounted in said housing for rotary movement, connection means at opposite ends of the shaft and adapted to be connected to the rotary part of said speedometer and to said flexible drive cable by interposing said shaft between said rotary part and said flexible drive cable, a stationary electric contact ring fixed to the inner side of the cylindrical wall of said housing and insulated therefrom, a spring-retained movable contact carried by said shaft in said housing and adapted to be moved outwardly by centrifugal force and against tension of the spring and to engage said contact ring at a predetermined speed of rotation of said shaft, and an electrically operated indicating element mounted on said vehicle and electrically connected to said contact ring for operation upon engagement of said movable contact with said contact ring.

2. A safety speed indicator for motor vehicles as defined in claim 1, wherein there is provided a plurality of indicating elements, a plurality of spaced contact rings, and a plurality of movable contacts all of which are moved outwardly by centrifgual force and each engages a different contact ring at a different speed of rotation of said shaft.

3. A safety speed-indicating device for motor vehicles having a speedometer and a flexible drive cable detachably connected to a rotary part of said speedometer, said safety speed-indicating device comprising a drumlike housing having a cylindrical wall, a closed end wall, a detachable end wall, and bearings located centrally on and extending through said end walls; a shaft in said housing and rotatably supported at its opposite ends by said bearings; connection means on opposite ends of said shaft and adapted to connect one end of said shaft to the rotary part of the speedometer and the other end of said shaft to the flexible drive cable by interposing said shaft between said rotary part and said flexible drive cable; an electrical contact ring fixed to the inner side of the cylindrical wall of said housing and insulated therefrom; a contact carried by said shaft and movable transversely thereof by centrifugal force produced by rotation of said shaft for engaging said contact ring; a spring for yieldably holding said movable contact against transverse movement relative to said shaft; an adjustment for the spring tension applied to said movable contact to effect contact of said movable contact with said contact ring at a predetermined speed of rotation of said shaft; and an electrically operated indicating element mounted on said vehicle and electrically connected to said contact ring and controlled in its operation by engagement of the movable contact with the contact ring.

4. A safety speed indicator for motor vehicles as defined in claim 3, wherein there is provided a plurality of indicating elements, a plurality of spaced contact rings, and a plurality of movable contacts all of which are moved outwardly by centrifugal force against their individually adjustable spring tension to engage each with a different contact ring at a different speed of rotation of said shaft.

5. A safety speed-indicating device for motor vehicles having a speedometer and a flexible drive cable detachably connected to a rotary part of said speedometer, said safety speed-indicating device comprising a drumlike housing having a cylindrical wall, a closed end wall, a detachable end wall, and bearings located centrally on and extending through said end walls; a shaft in said housing and rotatably supported at its opposite ends by said bearings, connection means on opposite ends of said shaft and adapted to connect one end of said shaft to the rotary part of the speedometer and the other end of said shaft to the flexible drive cable by interposing said shaft between said rotary part and said flexible drive cable shaft; an electrical contact ring fixed to the inner side of the cylindrical wall of said housing and insulated therefrom; a tubular member carried by said shaft and adjustable transversely of said shaft; an electrical contact plunger slidable in one end portion of said tubular member; an adjusting screw threaded in the opposite end portion of said tubular member; a contractile spiral spring in said tubular member and having its opposite ends connected to said slidable contact and to said adjustable screw, said slidable contact being aligned with said contact ring and arranged for engaging said contact ring when moved outwardly by centrifugal force produced by rotation of said shaft; and an electrically operated indicating element mounted on said vehicle and electrically connected to said contact ring and controlled in its operation by engagement of the sliding contact with the contact ring.

6. A safety speed-indicating device for motor vehicles having a speedometer and a flexible drive cable detachably connected to a rotary part of said speedometer, said safety speed-indicating device comprising a drumlike housing having a cylindrical wall, a closed end wall, a detachable end wall, and bearings located centrally on and extending through said end walls; a shaft in said housing and rotatably supported at its opposite ends by said bearings; said shaft having a plurality of spaced openings therethrough extending transversely thereof; connection means on opposite ends of said shaft and adapted to connect one end of said shaft to the rotary part of the speedometer and the other end of said shaft to the flexible drive cable by interposing said shaft in said housing between said rotary part and said flexible drive cable; a plurality of spaced electrical contact rings fixed to the inner side of the cylindrical wall of said housing and insulated from one another and said housing; a plurality of tubular members threaded in the openings through said shaft and adjustable transversely of said shaft; locking means for holding said tubular members in adjusted positions; an electrical contact plunger slidable in one end portion of each of said tubular members; an adjusting screw threaded in the opposite end portion of each of said tubular members; a contractile spiral spring in each of said tubular members and having its opposite ends connected to said slidable contact and to said adjustable screws; locking means for holding each of said adjusting screws in adjusted position, each of said slidable contacts being aligned with a different contact ring and arranged for engaging said contact ring when moved outwardly by centrifugal force produced by rotation of said shaft; and a plurality of electrically operated indicating elements mounted on said vehicle and each electrically connected to a different contact ring and controlled in its operation by engagement of a sliding contact with the contact ring to which the element is electrically connected.

References Cited in the file of this patent

UNITED STATES PATENTS

| | | |
|---|---|---|
| 1,642,617 | Marcus | Sept. 13, 1927 |
| 2,079,539 | White et al. | May 4, 1937 |
| 2,614,161 | Bailey et al. | Oct. 14, 1952 |